United States Patent [19]

Shin

[11] Patent Number: 5,387,947
[45] Date of Patent: Feb. 7, 1995

[54] MOTION VECTOR DETECTING METHOD OF A VIDEO SIGNAL

[75] Inventor: Hyun-Soo Shin, Seoul, Rep. of Korea

[73] Assignee: Samsung Electronics Co., Ltd., Kyungki-Do, Rep. of Korea

[21] Appl. No.: 85,796

[22] Filed: Jul. 6, 1993

[30] Foreign Application Priority Data

Jul. 3, 1992 [KR] Rep. of Korea ............... 1992-11839

[51] Int. Cl.$^6$ ................................... H04N 7/130
[52] U.S. Cl. ....................................... 348/699
[58] Field of Search ............... 358/105, 96, 182, 222, 358/136; H04N 7/130; 348/384, 402, 407, 413, 416, 699, 415

[56] References Cited

U.S. PATENT DOCUMENTS

| | | | |
|---|---|---|---|
| 4,488,174 | 12/1984 | Mitchell et al. | 348/415 |
| 4,546,385 | 10/1985 | Anastassiou | 358/96 |
| 4,656,507 | 4/1987 | Greaves | 358/96 |
| 4,847,677 | 7/1989 | Music et al. | 358/136 |
| 4,884,136 | 11/1989 | Ninomiya et al. | 358/105 |
| 5,153,719 | 10/1992 | Ibenthal | 358/136 |
| 5,251,028 | 10/1993 | Iu | 358/105 |
| 5,282,255 | 1/1994 | Bovik et al. | 348/384 |

Primary Examiner—Tommy P. Chin
Assistant Examiner—Richard Lee
Attorney, Agent, or Firm—Sughrue, Mion, Zinn, Macpeak & Seas

[57] ABSTRACT

A motion vector detecting method of a digital video signal includes an edge image detecting process for detecting an edge for the video signal within a current frame and a previous frame, an image converting process for converting the edge detected image from the edge image detecting process into a binary-coded image, and a motion vector detecting process for detecting an interframe motion vector with respect to only an edge part from the binary-coded image.

6 Claims, 3 Drawing Sheets

MOTION VECTOR DETECTING METHOD OF A VIDEO SIGNAL

BACKGROUND OF THE INVENTION

The present invention relates to higher picture quality televisions such as a high definition television (HDTV), and more particularly to a motion vector detecting method of a video signal capable of effectively detecting an interframe motion vector in order to process a pseudo-moving image.

Typically, a well known motion vector is to express the motion direction and the motion amount of a current frame in comparison with a previous frame to a vector quantity of a pixel unit in the image of two consecutive frames. According to a variation factor between two frames, the motion vector is classified into an intraframe motion vector for an object within the frame and an interframe motion vector caused by the panning of a camera.

In MUSE system developed by N.H.K. of Japan, a video signal is divided into a moving region, a stationary region and a pseudo-moving region according to a reproducing method at a receiver side. The pseudo-moving region means that an entire screen moves by the panning of the camera, for example. When the image of a previous frame shown in FIG. 1A moves fight and upward at a current frame as shown in FIG. 1B, if the image is processes to the moving region, the softing of the image occurs at the receiver side as indicated in FIG. 1C. Therefore, in the case that the entire screen instead of an object within the screen moves, the MUSE system processes the image to the pseudo-moving region. In this case, the motion between frames, i.e. the interframe motion vector, is detected and the detected motion vector is sent to the receiver side. If the receiver side reads out previous frame information within a frame memory by shifting an address as much as the motion of the image, the image can be processed to the pseudo-moving image as shown in FIG. 1D.

As methods for obtaining the interframe motion vector, an absolute error and a mean square error for calculating a minimum motion amount between consecutive images, and a cross correlation for obtaining a maximum motion amount have been used. However, these methods have slow operation processing speed and complicate hardware.

SUMMARY OF THE INVENTION

It is accordingly an object of the present invention to provide a motion vector detecting method capable of improving operation processing speed.

It is another object of the present invention to provide a motion vector detecting method capable of simplifying hardware.

In accordance with one aspect of the present invention, there is provided a motion vector detecting method including an edge image detecting process for detecting an edge for the video signal within a current frame and a previous frame, a binary-coded image process for binary-coding an edge detected image from the edge detected process, and a motion vector detecting process for detecting an interframe motion vector with respect to an edge part from the binary-coded image.

Preferably, the edge image detecting process includes the steps of calculating a gradient between adjacent pixels for each direction by a pixel unit of the video signal, and detecting the edge by comparing a maximum gradient value with a given threshold value.

Preferably, the image converting process replaces a pixel positioned to the edge part out of the edge detected image with "1" and the pixel positioned to the part except the edge part with "0".

Preferably, the motion vector detecting process includes the steps of dividing M×N (where M and N are a natural number) pixels of the current frame into N1×N2 (where N1 and N2 are 4, 8 and 16) blocks and calculating the number Nb of "1" for each block to check whether or not a corresponding block contains the edge part, calculating the number Nb of "1" within a next block when the number Nb is less than a first threshold value and checking a motion vector for each block by checking one pixel within a block of the current frame and the pixel of the previous frame when the number Nb is greater than the first threshold value and detecting a ratio motion vector showing the most frequent motion vector out of motion vectors obtained from each block, and determining the motion vector as the interframe motion vector when the ratio motion vector is greater than a second threshold value and processing the image to a moving region when the ratio motion vector is less than the second threshold value.

BRIEF DESCRIPTION OF THE DRAWINGS

Other objects, advantages and features of the present invention will become apparent from the following detailed description with reference to the accompanying drawings, in which.

DETAILED DESCRIPTION OF THE PREFERRED EMBODIMENT

Figure 1A:
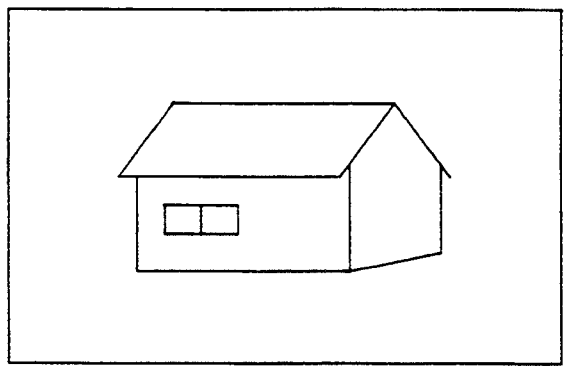
FIGS. 1A to 1D are diagrams showing a conventional pseudo-moving image processing method in a MUSE system.
Figure 1B:
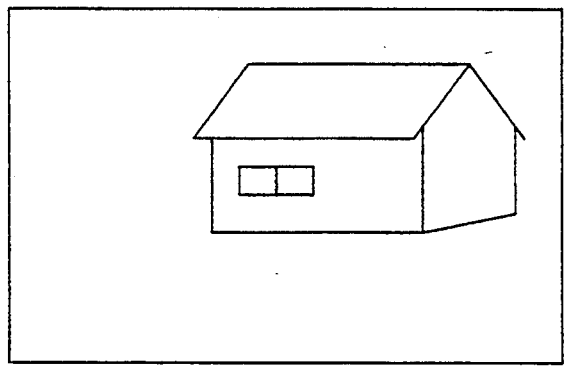
Figure 1C:
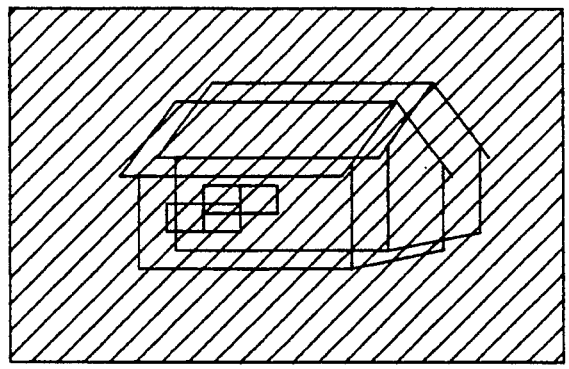
Figure 1D:
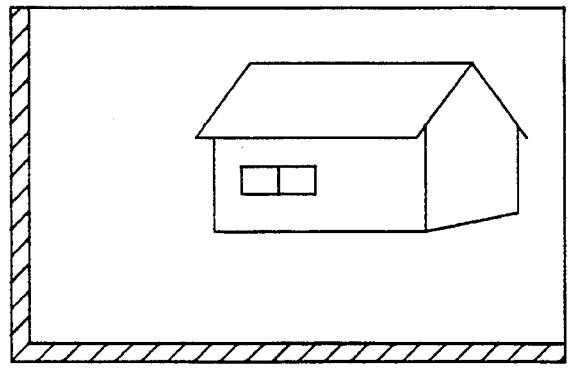
Figures 2, 3A, 3B, 3C, 3D:
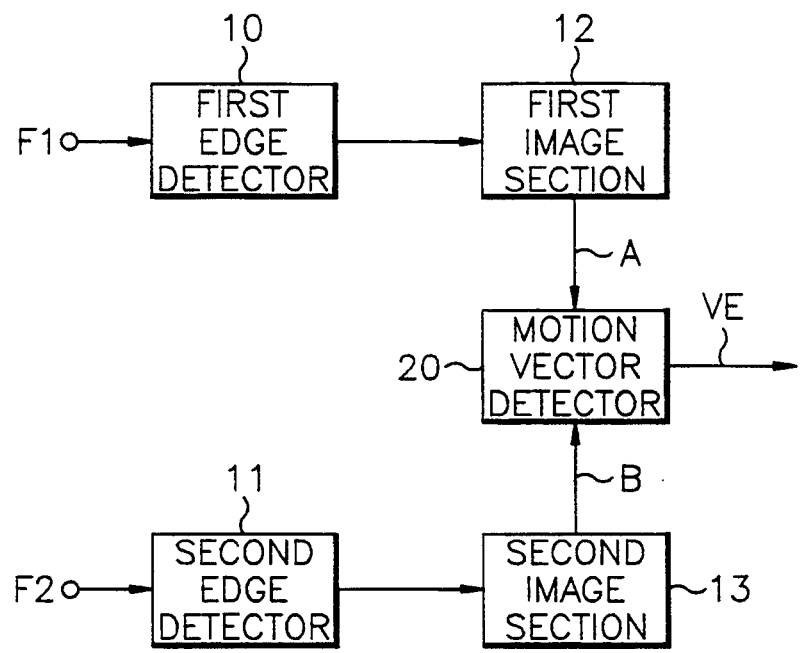
FIG. 2 is a block diagram showing the construction for detecting a motion vector applied to the present invention.
FIGS. 3A to 3D are diagrams showing edge detecting processes applied to the present invention.

Referring to FIG. 2, the construction for detecting a motion vector includes first and second edge detectors 10 and 11, first and second image sections 12 and 13, and a motion vector detector 20. The video signals of previous and current frames are edge-detected through the first and second edge detectors 10 and 11. To detect an edge, a local 8 directional edge detection operator is utilized as illustrated in FIGS. 3A to 3D. That is, the edge is detected from the relationship between adjacent 8 pixels. Assuming that any pixel of the image having the size of M×N is x[m][n] (where m=1,2,...,M and n=1,2,...,N), and a gradient for each direction is gk (where k=1,2,...,8), the gradient gk can be obtained as follows:

$g1 = x[m][n+1] + x[m-1][n+1] + x[m+1][n+1] - x[m-1][n-1] - x[m+1][n-1]$, $g2 = x[m-1][n+1] + x[m][n+1] + x[m-1][n] - x[m+1][n-1] - x[m][n-1] - x[m+1][n]$, $g3 = x[m-1][n] + x[m-1][n+1] + x[m-1][n-1] - x[m+-x[m+1][n+1] - x[m+1][n-1]$, $g4 = x[m-1][n-1] + x[m][n-1] + x[m-1][n] - x[m+1][n+1] - x[m][n+1] - x[m+1][n]$, $g5 = -g1$, $g6 = -g2$, $g7 = -g3$, and $g8 = -g4$.

If a maximum gradient value Max(gk) is greater than a given threshold vale, the maximum gradient value Max(gk) is positioned to the pixel x[m][n], and if it is less than the threshold value, a zero ("0") is positioned to the pixel x[m][n]. By applying these processes to the M×N pixels, an edge detected image can be obtained.

The edge detected image is converted into a binary image. The binary coded image is composed of "0" and "1". If the pixel is positioned to the edge part, the pixel has a value of "1", and otherwise, the pixel has "0". Therefore, when the edge detected image is applied to the first and second image sections 12 and 13, the pixel positioned to the edge part is replaced with "1" and thus the edge detected binary-coded image is obtained.

The first and second edge detectors 10 and 11, and the first and second image sections 12 and 13 may be simplified in their structure by replacing the pixel with not the maximum gradient value but "1" when the maximum gradient of any pixel is greater than the threshold value. The binary-coded image is supplied to the motion vector detector 20, and then the interframe motion vector is detected by the flows shown in FIG. 4.

Figure 4:
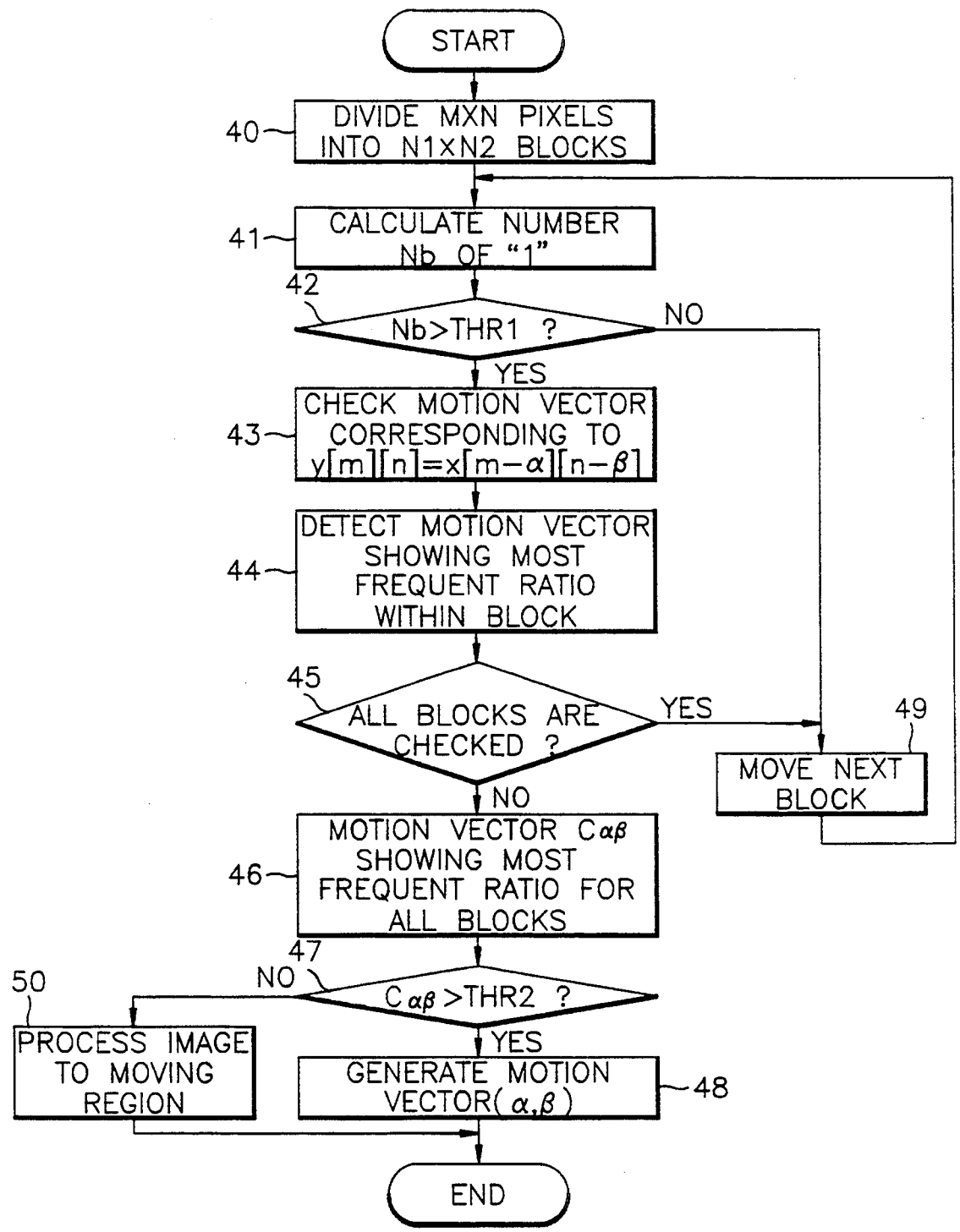
FIG. 4 is a flow chart showing a procedure for detecting a motion vector according to the present invention.

Referring to FIG. 4, M×N pixels of a current frame are divided into N1×N2 (where N1 and N2=4, 8, 16) blocks at step 40. At step 41, the number Nb of "1" within the block is checked with respect to each block, to check whether or not a corresponding block contains the edge part. At step 42, a check is made to see if the number Nb is greater than a first threshold value THR1. If the number Nb is less than the first threshold value THR1, a next block is checked at step 49. If the number Nb is greater than the first threshold vale THR1, it is judged that the block contains the edge part and the motion vector $(\alpha,\beta)$ corresponding to $y[m][n]=x[m-\alpha][n-\beta]$ is calculated, at step 43, by comparing the pixel y[m][n](where m=1, ... ,N1 and n=1, ... ,N2) within the block of the current frame with the pixel x[m-$\alpha$][n-$\beta$] (where $\alpha$ and/$\beta$=−8, ... ,8) of the previous frame. At step 44, the motion vector ($\alpha$, $\beta$) for all the pixels within the block is checked and the motion vector ($\alpha\beta$) showing the most frequent ratio is determined as the motion vector for that block. At step 46, the motion vector $C_{\alpha\beta}$ showing the most frequent ratio in all blocks is detected by comparing each motion vector ($\alpha$, $\beta$) obtained from each block. At step 47, a decision is made to see if the motion vector $C_{\alpha\beta}$ is greater than a second threshold value THR2 (where THR2>0.85). If it is greater than the second threshold value, the motion vector $C_{\alpha\beta}$ is determined as the interframe motion vector, at step 48, and if it is less than the second threshold value THR2, it is judged that there is no interframe motion vector. Therefore, at step 50, the image is processed to the moving region. If the panning of the camera is over 8 pixels per frame, since picture quality is degraded enough to process the entire screen to the moving region, there is no need to calculate the motion vector. Hence, the motion vector $(\alpha,\beta)$ has the range of (−8, −8) to (8, 8).

As may be apparent from the aforementioned description, the illustrated embodiment of the present invention may effectively detect the interframe motion vector for processing pseudo-moving image in MUSE system of the HDTV.

While preferred embodiments of the present invention have been particularly shown and described, it will be understood by those skilled in the art that foregoing and other changes in form and details may be made without departing from the spirit and scope of the present invention.

What is claimed is:

1. A method of detecting motion direction and motion amount of a digital video signal in order to process a pseudo-moving image, comprising the steps of:

detecting an edge of said pseudo-moving image within a current frame and a previous frame and outputting an edge detected image, said detecting step including the steps of: calculating a gradient between adjacent pixels for each direction by a pixel unit of said video signal, and comparing a maximum gradient value with a given threshold value;

converting the edge detected image into a binary-coded image;

detecting an interframe motion vector with respect to only an edge part of the binary-coded image; and processing said pseudo-moving image as interframe motion or to a moving region based on said interframe motion vector.

2. The method as claimed in claim 1, wherein the step of converting the edge detected image into a binary-coded image comprises the steps of:

replacing a pixel positioned at the edge part of said edge detected image with an edge indicating value; and replacing a pixel not positioned at the edge part of said edge detected image with a non-edge indicating value which is different from the edge indicating value.

3. The method as claimed in claim 2, wherein the edge indicating value is "1" and the non-edge indicating value is "0".

4. The method as claimed in claim 2, wherein the step of detecting an interframe motion vector comprises the steps of:

dividing M×N pixels of said current frame into a plurality of N1×N2 blocks, where M and N are natural numbers;

counting, for each one of said N1×N2 blocks, a number, Nb, of pixels having the edge indicating value;

for each one of said N1×N2 blocks where Nb is greater than a first threshold value, determining a motion vector for each pixel y[m][n], where m=1, ..., N1 and n=1, ..., N2, by comparing the pixel y[m][n] with a pixel x[m-$\alpha$][n-$\beta$], of the previous frame, where $\alpha$ and $\beta$=−8, ..., 8, thereby resulting in a plurality of motion vectors for each of said N1×N2 blocks where Nb is greater than said first threshold value;

for each one of said N1×N2 blocks where Nb is greater than the first threshold value, determining a most frequent block motion vector from the plurality of motion vectors determined for the pixels y[m][n] within each one of said N1×N2 blocks where Nb is greater than the first threshold value, thereby resulting in a plurality of most frequent block motion vectors;

determining a ratio motion vector equal to a most frequent block motion vector from said plurality of most frequent block motion vectors obtained from said N1×N2 blocks having Nb greater than the first threshold; and if said ratio motion vector is greater than a second threshold value, then determining said ratio motion vector as said interframe motion vector, and if said ratio motion vector is less than or equal to said second threshold value, then processing the pseudomoving image to a moving region.

5. The method as claimed in claim 4, wherein the second threshold value is greater than 0.85 and less than 1.

6. The method as claimed in claim 4, wherein N1 and N2 are equal to each other and are one of 4, 8 or 16.

* * * * *